July 18, 1950     R. R. THOMAS     2,515,616
MOTION CONVERTING MECHANISM
Filed March 29, 1948     2 Sheets-Sheet 1
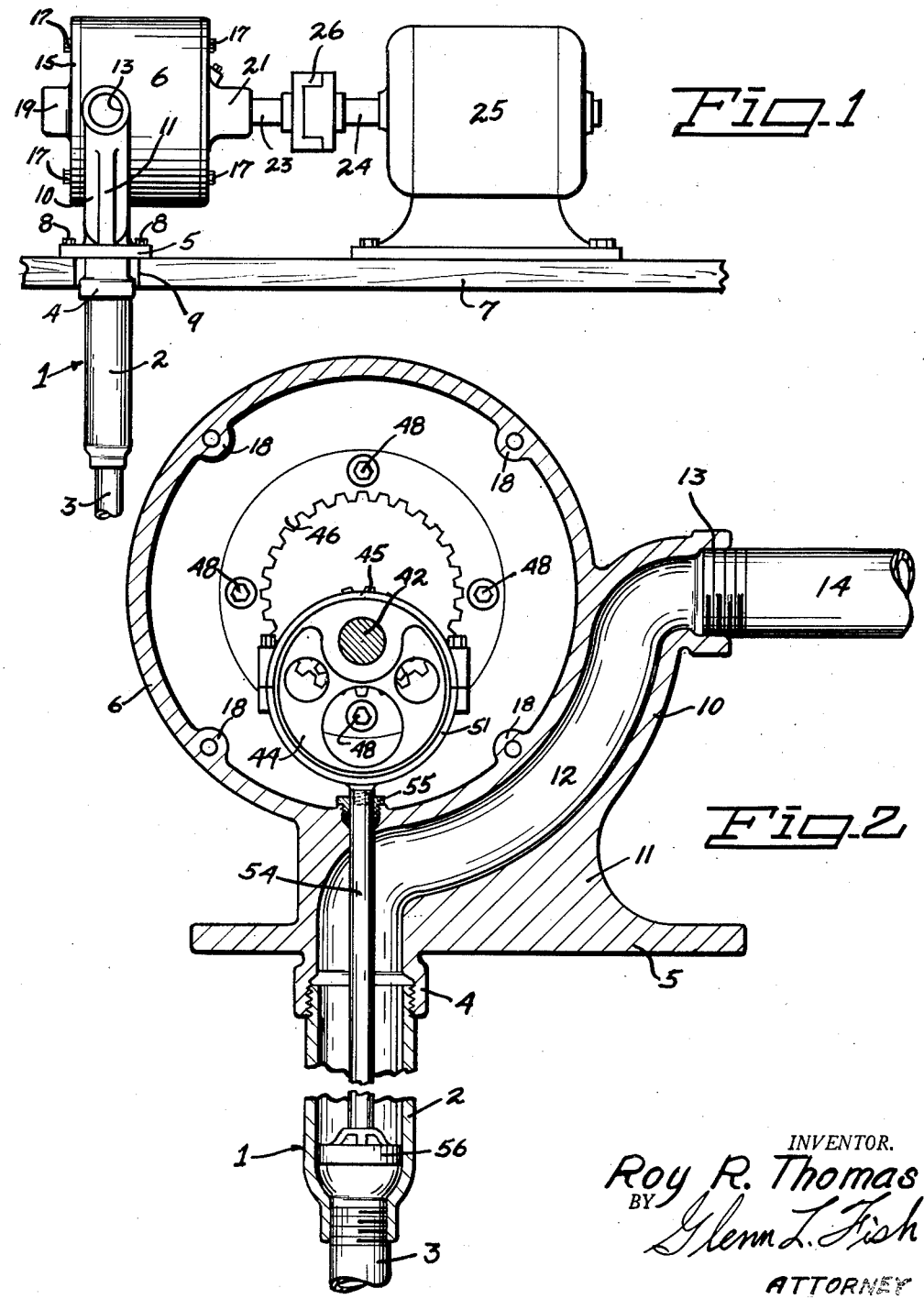
INVENTOR.
Roy R. Thomas
BY Glenn L. Fish
ATTORNEY Patented July 18, 1950

2,515,616

UNITED STATES PATENT OFFICE 2,515,616

MOTION CONVERTING MECHANISM

Roy R. Thomas, Spokane, Wash., assignor to Lyle Gordan McLean, Spokane, Wash.

Application March 29, 1948, Serial No. 17,736

1 Claim. (Cl. 74—52)

This invention relates to pumps and more particularly to a reciprocating pump having rotary drive mechanism, it being one object of the invention to provide drive mechanism so constructed that rotary motion will be transformed into reciprocating motion for the pump piston.

Another object of the invention is to provide a pump having driving mechanism of such formation that its main shaft may be connected with the shaft of a motor and turn at the same speed as the motor shaft, movement being transmitted from the main shaft to a crank shaft at reduced speed and the pump rod being so connected with the crank shaft that reciprocating movements will be imparted to the pump rod.

Another object of the invention is to provide a drive mechanism including planetary gears for transmitting rotary motion from the main shaft to the crank shaft.

Another object of the invention is to provide a drive mechanism which is compact and consists of a few number of gears and shafts.

The invention is illustrated in the accompanying drawings wherein:

Fig. 1 is a side view of the improved pump and its motor.

Fig. 2 is a vertical sectional view taken transversely of the drive mechanism.

Figure 3:
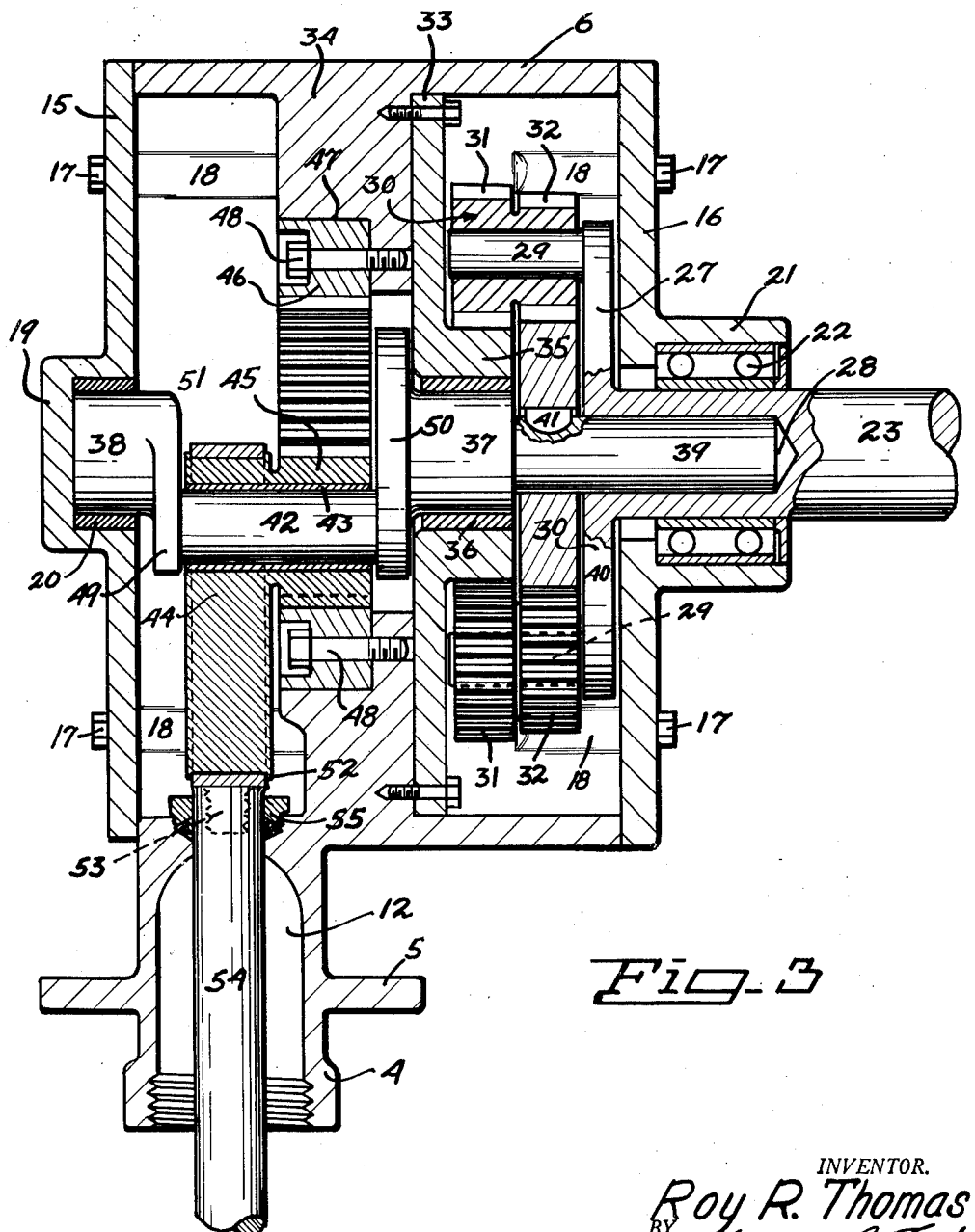
Fig. 3 is a vertical sectional view taken longitudinally of the drive mechanism.

This improved operating mechanism is used in connection with a pump 1 which has a cylinder 2 disposed vertically and having its lower end in threaded engagement with a pipe 3. The upper end of the cylinder is screwed into a socket or neck 4 which projects downwardly from the base 5 of a casing 6, and from an inspection of Figure 1 it will be seen that the base 5 is secured upon a well cover 7 by a suitable number of bolts 8 and has its neck extending downwardly through an opening 9 formed in the wall cover. A thick extension 10, braced by a web 11, connects the casing 6 with the base 5 and supports it above the base and is formed with a passage 12 extending from the neck 4 to a neck or socket 13 which projects from the upper end of the extension and is internally threaded to receive a delivery pipe 14. The casing is circular and at opposite ends is closed by walls or heads 15 and 16 which are removably secured by screws 17 passed through openings in the end walls and screwed into bosses 18 extending transversely of the inner surface of the annular wall of the casing. An outstanding socket 19 which is open at its inner end and lined by a bushing 20 is formed centrally of the head or end wall 15 and from the center of end wall 16 extends a sleeve or socket 21 in which is mounted a bearing 22.

Through the bearing 21 extends a drive shaft 23 having its outer end connected with the shaft 24 of a motor 25 by a coupling 26. The inner end of the drive shaft carries a disk 27 and is bored longitudinally to form a socket 28, and from the peripheral edge portion of the disk project pins 29. These pins are eccentric to the shaft 23 and each carries a double gear 30 forming a pair of gears or pinions 31 and 32, the gear 31 being larger than the companion gear 32. While two shafts 29 and gears carried thereby have been shown in the drawings it will be understood that any number desired may be provided. A plate 33 is removably secured against one side face of an annular flange 34 located within the casing midway the length thereof and this plate is formed at its center with an opening surrounded by a sleeve 35 which is formed externally with teeth and constitutes a gear meshing with the teeth of the large pinions 31. A bushing 36 fits snugly within the sleeve or gear 35 and through this bushing is rotatably mounted a crank shaft 37 having an end portion 38 rotatably mounted through the bushing 20. The end portion 39 of the crank shaft is of reduced diameter and this end portion is rotatably received in the socket 28 with a portion exposed between the gear 35 and the disk 27 and carrying a large gear 40 which meshes with the pinions 32 and is secured upon the crank shaft by a key 41. The gears 31, 32, 35, and 40 will thus form a planetary gearing and cause rotary motion to be transmitted at reduced speed from the drive shaft 23 to the crank shaft 37. The crank portion 42 is surrounded by a sleeve or bushing 43 and about this bushing fits an eccentric disk 44 with which is integrally formed a gear or pinion 45. This pinion meshes with the internal teeth of a gear ring 46 which is secured in a recess 47 formed in the annular flange 34 by screws 48 and during rotation of the crank shaft the gear 45 will be rotated and the cam disk thus caused to have swinging movement about the crank portion or pin 42 of the crank shaft. The arm 49 and the disks 50 of the crank shaft hold the pin 42 in eccentric relation to the end portions of the cranks shaft and during rotation of the crank shaft the cam disk has vertical movement in the casing as well as swinging movement about the pin 42. A collar 51 formed of upper and lower sections surrounds the eccentric disk, which has flanges 52 around its side edges to hold the collar in place thereon, and from the collar extends a depending stem 53 which is screwed into a socket formed in the upper end of a pump rod 54. This pump rod passes through a packing gland 55 and downwardly through the pump cylinder and the lower end portion of the water passage 12 and at its lower end carries a pump piston 56 by means of which water is drawn through pipe 3 from the well and forced outwardly through the water passage 12 and the delivery pipe 14 when the pump rod is reciprocated vertically during rotation of the crank shaft and movement of the cam disk.

Having thus described the invention, what is claimed is:

In a mechanism for converting rotary motion to reciprocating motion, a casing having end walls provided with aligned bearings, an annular flange within said casing spaced from the end walls thereof, a drive shaft rotatably mounted through the bearing of one end wall of the casing and formed with a longitudinally extending socket leading from its inner end, a disk about the inner end of said drive shaft, stub shafts projecting from said disk near the periphery thereof and spaced from each circumferentially of the disk, double gears rotatably carried by said stub shafts, a plate mounted against a side face of said flange confronting said stub shafts and formed with a central opening surrounded by a sleeve extending towards said disk and formed with external teeth and constituting a stationary gear, a crank shaft extending longitudinally in said casing and having its mid-portion rotatably mounted through said sleeve and one end portion snugly received in said socket and rotatable therein, the other end portion of said crank shaft being rotatably mounted in the socket of the second end wall of the casing, a gear rigidly mounted upon said crank shaft adjoining the stationary gear, the double gears being in mesh with the stationary gear of said plate and the gear carried by the crank shaft, an internally toothed gear ring removably mounted in a recess formed in said flange at the opposite side thereof from said plate and surrounding the crank portion of the crank shaft, an eccentric disk loosely mounted about the crank portion of said crank shaft and carrying a pinion at its inner side fitting loosely about the said crank portion and meshing with the internal teeth of the gear ring, a rod slidable longitudinally in a direction radially of the casing, and a collar carried by said rod and loosely mounted about the eccentric disk and imparting reciprocating movement to said rod as the crank shaft turns and the eccentric disk swings about the crank portion of the crank shaft.

ROY R. THOMAS.

REFERENCES CITED

The following references are of record in the file of this patent:

UNITED STATES PATENTS

| Number | Name | Date |
| --- | --- | --- |
| 549,854 | Norman | Nov. 12, 1895 |
| 1,633,890 | Ford | June 28, 1927 |
| 1,896,445 | Gibson | Feb. 7, 1933 |
| 2,185,902 | Schubert | Jan. 2, 1940 |
| 2,198,921 | Schaff | Apr. 30, 1940 |
| 2,223,100 | Foster | Nov. 26, 1940 |
| 2,250,584 | Krueger et al. | July 29, 1941 |